(12) United States Patent  (10) Patent No.: US 8,610,940 B2
Ohta  (45) Date of Patent: Dec. 17, 2013

(54) DISPLAYING SETTINGS OF A RE-OUTPUT CONDITION FOR DATA

(75) Inventor: Shingo Ohta, Chiba (JP)

(73) Assignee: Ricoh Company, Limited, Tokyo (JP)

( * ) Notice: Subject to any disclaimer, the term of this patent is extended or adjusted under 35 U.S.C. 154(b) by 926 days.

(21) Appl. No.: 12/723,952

(22) Filed: Mar. 15, 2010

(65) Prior Publication Data

US 2010/0238497 A1  Sep. 23, 2010

(30) Foreign Application Priority Data

Mar. 18, 2009  (JP) .................................. 2009-067072

(51) Int. Cl.
*G06K 15/00* (2006.01)
(52) U.S. Cl.
USPC ........................................................ 358/1.16
(58) Field of Classification Search
USPC ................................................ 358/1.15, 1.16
See application file for complete search history.

(56) References Cited

U.S. PATENT DOCUMENTS

| 7,595,903 | B2 | 9/2009 | Kizaki et al. |
| 2005/0134903 | A1 | 6/2005 | Tanimoto et al. |
| 2005/0280854 | A1* | 12/2005 | Sato ................. 358/1.9 |
| 2006/0171513 | A1 | 8/2006 | Yoshida et al. |
| 2008/0021862 | A1 | 1/2008 | Ohta |

FOREIGN PATENT DOCUMENTS

| CN | 1625209 A | 6/2005 |
| JP | 2002-232617 | 8/2002 |
| JP | 3841645 | 8/2006 |
| JP | 4268117 | 2/2009 |

OTHER PUBLICATIONS

U.S. Appl. No. 12/706,539, filed Feb. 16, 2010, Ohta.
Chinese Office Action issued Oct. 26, 2011 in patent application No. 2010101345114 (with English-language Translation).
Extended European Search Report issued Feb. 22, 2013, in European Patent Application No. 10250490.9.

* cited by examiner

*Primary Examiner* — Eric A Rust
(74) *Attorney, Agent, or Firm* — Oblon, Spivak, McClelland, Maier & Neustadt, L.L.P.

(57) ABSTRACT

An image processing apparatus includes an input control unit that receives the input of document data that is a target to be output and the output condition of the document data, an image output unit that outputs the document data in accordance with the received output condition, an HDD that stores therein the output condition under which the document data has been output, as a re-output condition to be set at a time when the document data is re-output, and a display control unit that displays the re-output condition on an operation display unit and, when a dependent item that is determined to be set together with a different item is present in the re-output condition, the display control unit displays a dependence-destination item that is the different item together with the re-output condition.

12 Claims, 16 Drawing Sheets

| DEPENDENT ITEM | DEPENDENCE-DESTINATION ITEM |
|---|---|
| TRANSMISSION DESTINATION: /ZZZ/ | DESIGNATED PROTOCOL: SMB |
| DESIGNATED PROTOCOL: SMB | TRANSMISSION DESTINATION: /ZZZ/ |
| ⋮ | ⋮ |
| ⋮ | ⋮ |

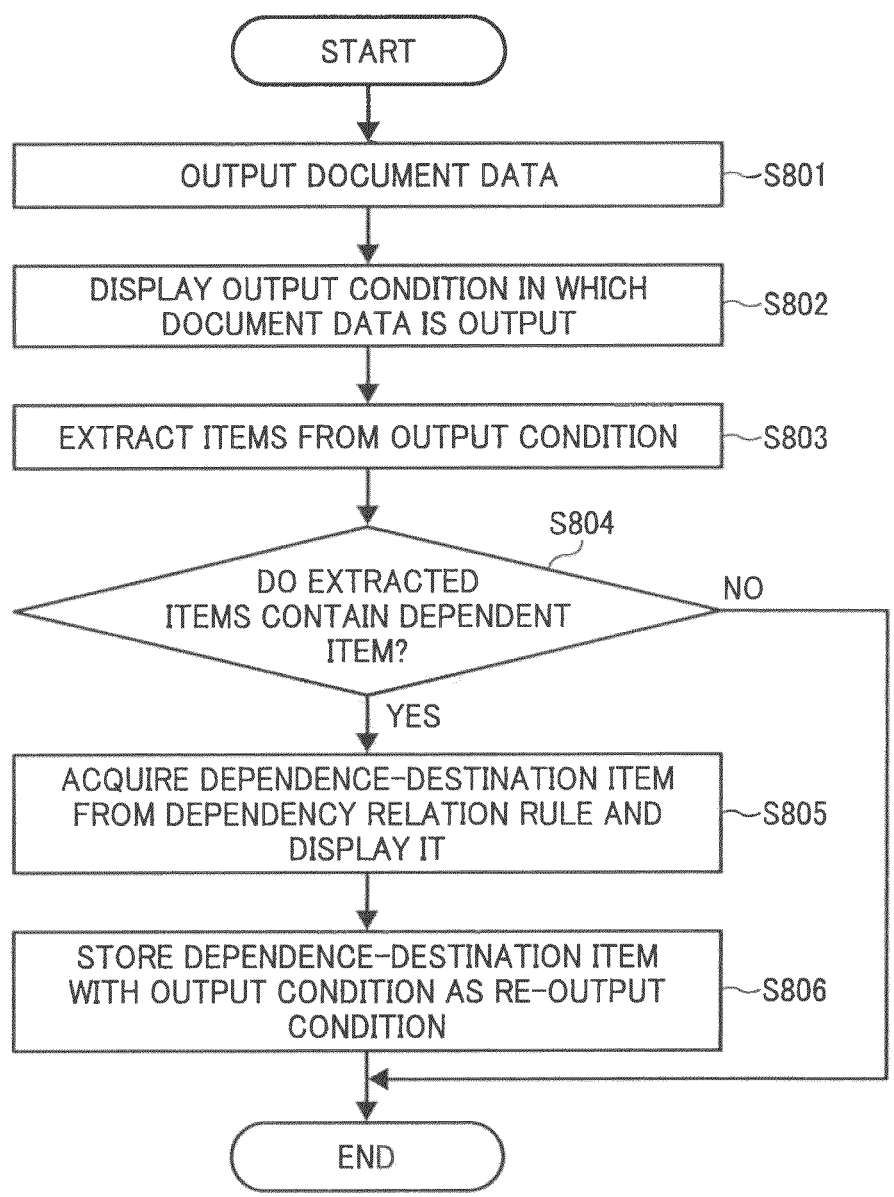

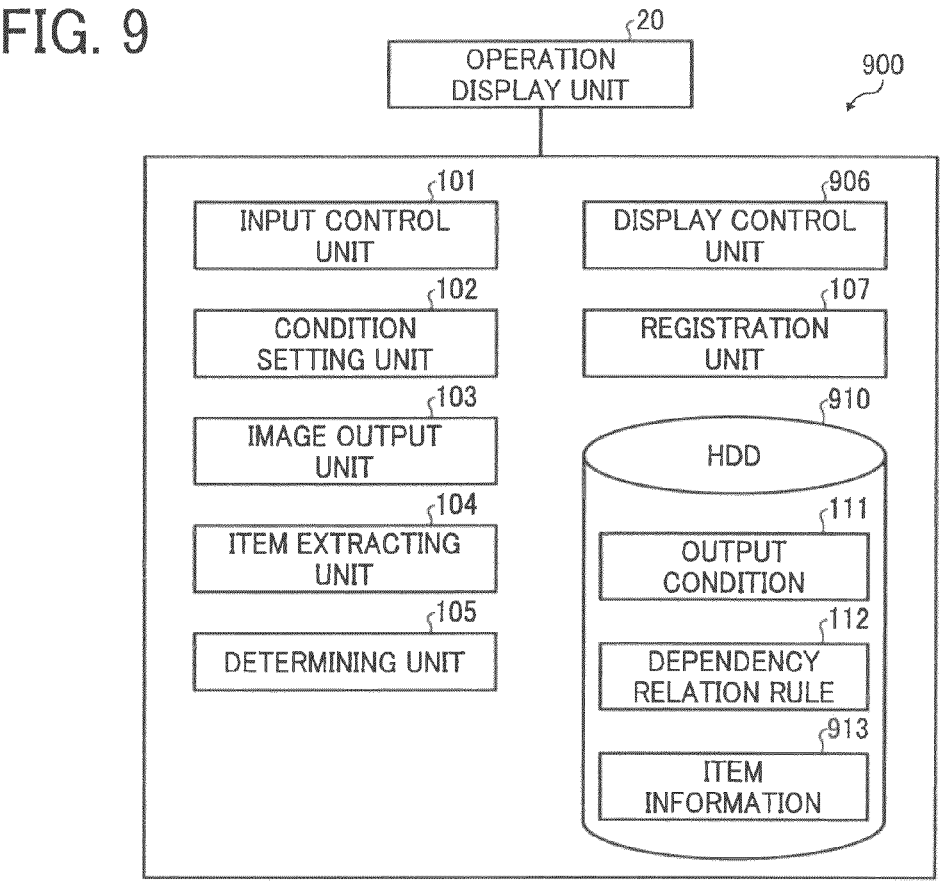

DISPLAYING SETTINGS OF A RE-OUTPUT CONDITION FOR DATA

CROSS-REFERENCE TO RELATED APPLICATIONS

The present application claims priority to and incorporates by reference the entire contents of Japanese Patent Application No. 2009-067072 filed in Japan on Mar. 18, 2009.

BACKGROUND OF THE INVENTION

1. Field of the Invention

The present invention relates to an image processing apparatus, an image processing method, and a program product.

2. Description of the Related Art

Heretofore, an image forming apparatus has been proposed that has a function of automatically resetting an output condition to the output condition of the previous output operation in order to quickly output data that is a target to be output by skipping a setting process of the output condition.

The output condition means, for example, in a copy function, the size of an original, the type of an original, the density, variable-magnification designation, combining, stapling, punching, duplexing, or various functions such as sorting and, in a facsimile function, means the size of a character, the size of an original, the type of an original, the density, a transmission destination number, or a processing condition such as the sending date and time.

Furthermore, an image processing apparatus has been proposed that has a function of storing, together with an output document, the output condition that has been set at an output operation, as a "re-output condition" to be set at the re-output operation, and automatically including the re-output condition in settings during the re-output operation of the document whose re-output condition is stored (for example, see Japanese Patent No. 3841645).

Specifically, a document data input/output device is disclosed that stores therein in advance a re-output condition to be commonly used for a plurality of sets of document data, stores therein the plurality of sets of document data, receives an output instruction for the stored document data, and outputs the document data for which output instruction is received in addition to the stored re-output condition.

In the technology disclosed in Japanese Patent No. 3841645, a condition item (hereinafter, referred to as a "dependent item"), which is uniquely determined if designated as a setting target, is defined in advance with respect to a predetermined output condition; however, because the dependent item is not displayed on a display screen in Japanese Patent No. 3841645, a user cannot check the details of set contents.

For example, although the name of a transmission destination is usually registered in association with a protocol, only the name of the transmission destination is displayed even if the user designates the name of the transmission destination on an operation screen and the specific transmission-destination protocol is not displayed, which results in wrong transmission, or the like.

SUMMARY OF THE INVENTION

It is an object of the present invention to at least partially solve the problems in the conventional technology.

According to an aspect of the present invention, there is provided an image processing apparatus that includes an input receiving unit that receives an input of document data that is a target to be output and an output condition of the document data; an image output unit that outputs the document data in accordance with the received output condition; a storage unit that stores therein the output condition under which the document data has been output, as a re-output condition to be set at a time when the document data is re-output; and a display control unit that displays the re-output condition on a display unit. When a dependent item that is determined to be set together with a different item is present in the re-output condition, the display control unit displays, together with the re-output condition, a dependence-destination item that is the different item.

According to another aspect of the present invention, there is provided an image processing method performed in an image processing apparatus that includes an input receiving unit, an image output unit, a storage unit, and a display control unit. The method includes receiving an input of document data that is a target to be output and an output condition of the document data using the input receiving unit; outputting the document data in accordance with the received output condition using the image output unit; storing, in the storage unit, the output condition under which the document data has been output, as a re-output condition to be set at a time when the document data is re-output; and displaying, under control of the display control unit, the re-output condition on a display unit. At the displaying, when a dependent item that is determined to be set together with a different item is present in the re-output condition, a dependence-destination item that is the different item is displayed together with the re-output condition.

According to still another aspect of the present invention, there is provided a computer program product comprising a computer-usable medium having computer-readable program codes embodied in the medium for processing an image in an image processing apparatus that includes an input receiving unit, an image output unit, a storage unit, and a display control unit. The program codes when executed causes a computer to execute the method according to the present invention.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 8 is a flowchart that illustrates the procedure of a dependence-destination item storing process;

FIG. 9 is a block diagram of an image processing apparatus according to a second embodiment;

FIG. 10 is a diagram that illustrates an example of item information;

DETAILED DESCRIPTION OF THE PREFERRED EMBODIMENTS

Preferred embodiments of an image processing apparatus 100 according to the present invention are explained in detail below with reference to the accompanying drawings.

(First Embodiment)

Figure 1:
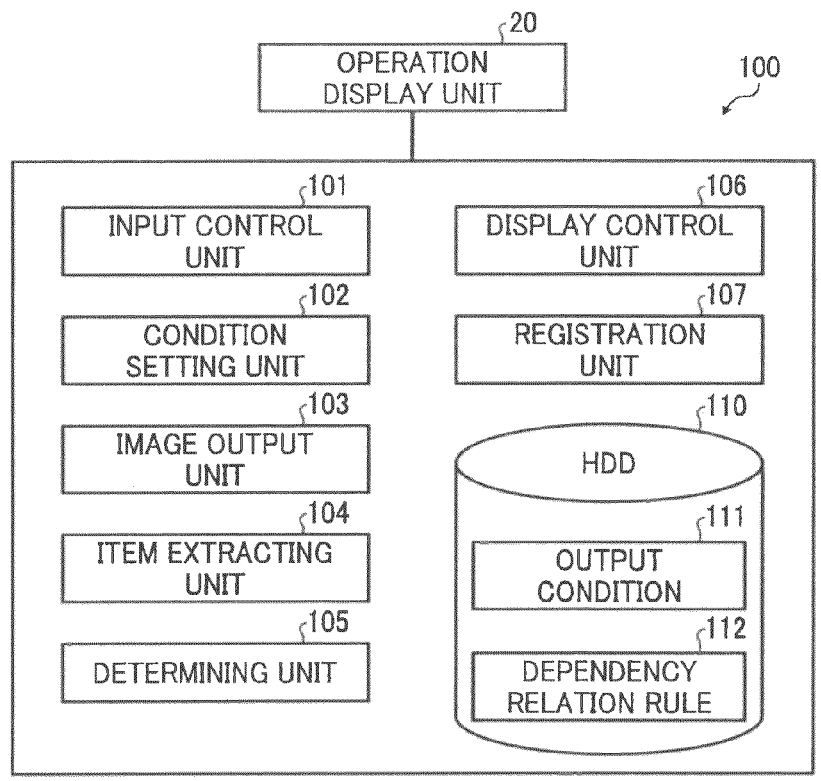
FIG. 1 is a block diagram of an image processing apparatus according to a first embodiment.

FIG. 1 is a block diagram that illustrates the configuration of the image processing apparatus 100 according to a first embodiment of the present invention. As illustrated in FIG. 1, the image processing apparatus 100 principally includes an input control unit 101, a condition setting unit 102, an image output unit 103, an item extracting unit 104, a determining unit 105, a display control unit 106, a registration unit 107, and a hard disk drive (HDD) 110 and is connected to an operation display unit 20.

The HDD 110 stores therein a plurality of sets of document data, an output condition 111, a re-output condition, and a dependency relation rule 112.

The output condition 111 is a condition to which an output format of the document data is set and which is constituted by items relating to specific processes for an output operation.

The re-output condition is a condition that is obtained by restoring the output condition under which the document data has been output and is defined as an output condition to be set at a time when the document data is re-output.

The dependency relation rule 112 is a rule that associates dependent items, which are items that constitute an output condition and are determined in advance to be set together with a different item, with dependence-destination items that are the different item.

Figure 2:
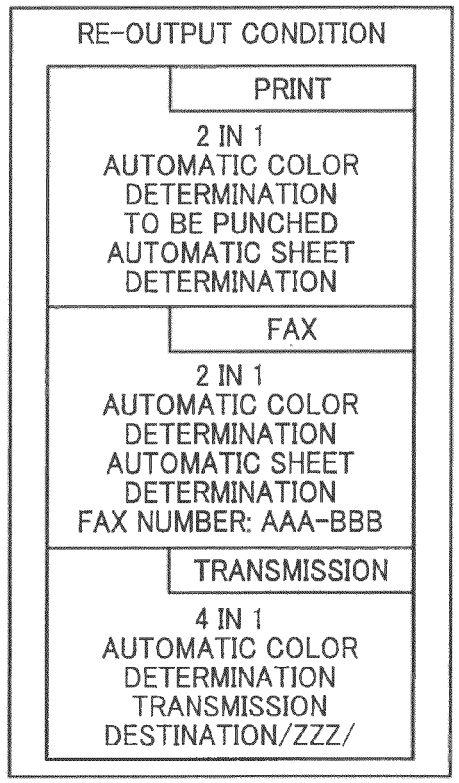
FIG. 2 is a diagram that illustrates an example of a re-output condition.

FIG. 2 is a diagram that illustrates an example of the re-output condition. In FIG. 2, the re-output condition set for certain document data in each process of printing, FAX, and transmission is stored.

As illustrated in FIG. 2, first, in a print process, the re-output condition is constituted by the output condition of four items, i.e., 2 in 1, automatic color determination, to be punched, and automatic sheet determination. Furthermore, in a FAX process, the re-output condition is constituted by the output condition of four items, i.e., 2 in 1, automatic color determination, automatic sheet determination, and FAX number. Moreover, in a transmission process, the re-output condition is constituted by the output condition of three items, i.e., 4 in 1, automatic color determination, and transmission destination path.

Figures 3, 4:
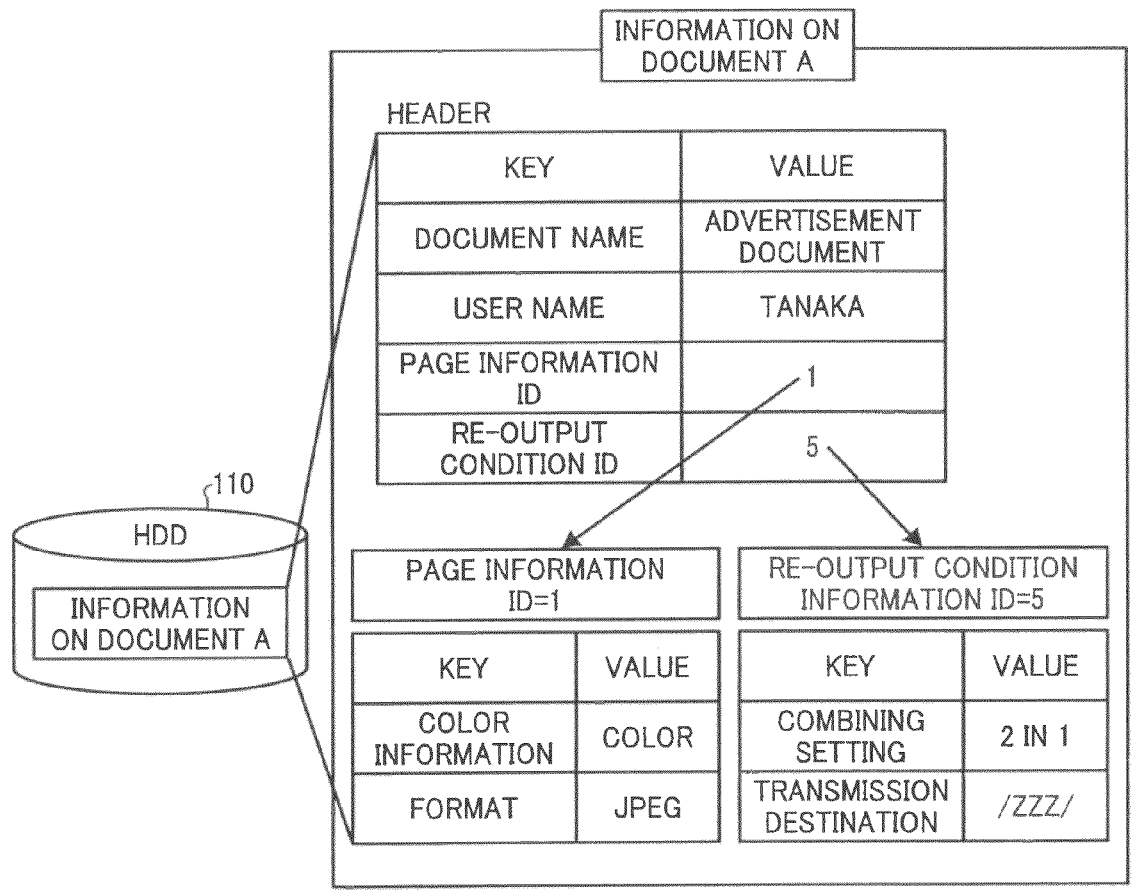
FIG. 3 is a diagram that illustrates an example of document information relating to document data.
FIG. 4 is a diagram that illustrates an example of a dependency relation rule.

FIG. 3 is a diagram that illustrates document information relating to document data A stored in the HDD 110. As illustrated in FIG. 3, "advertisement document" as a document name, "TANAKA" as a user name, "ID=1" as a page information ID, and "ID=5" as a re-output condition ID are registered in the header of the document data A.

The re-output condition ID is identification information of the re-output condition that corresponds to the document data, and the re-output condition ID is linked so that the re-output condition is stored.

Furthermore, "color" for color information, "JPEG" for a format, "2 in 1" for a combining setting, and "/ZZZ/" for a transmission destination are registered as the contents of the re-output condition ID=5.

FIG. 4 is a diagram that illustrates an example of the dependency relation rule 112 stored in the HDD 110. The dependency relation rule 112 illustrated in FIG. 4 associates "transmission destination:/ZZZ/", which is a dependent item, with "designated protocol:SMB", which is a dependence-destination item, and associates "designated protocol:SMB", which is a dependent item, with "transmission destination:/ZZZ/", which is a dependence-destination item.

Specifically, it is indicated that, if "/ZZZ/" is designated as a transmission designation, "SMB" assigned as the designated protocol is selected. In the same manner, it is indicated that, if "SMB" is designated as the designated protocol, "/ZZZ/" assigned as the transmission designation is selected.

The input control unit 101 receives, from a user, the input of document data that is a target to be output.

The item extracting unit 104 extracts, from the re-output condition associated with the document data, items that constitute the re-output condition.

The determining unit 105 determines whether a dependent item is present among the items extracted by the item extracting unit 104 by referring to the dependency relation rule 112. Specifically, it conducts a search as to whether the extracted item is registered in the dependency relation rule 112 as a dependent item.

If the determining unit 105 determines that a dependent item is present, the display control unit 106 acquires a dependence-destination item that corresponds to the dependent item from the dependency relation rule and displays the acquired dependence-destination item together with the re-output condition on the operation display unit 20. Specifically, if the extracted item is registered in the dependency relation rule 112 as a dependent item, the corresponding dependence-destination item is acquired and displayed.

Figure 5:
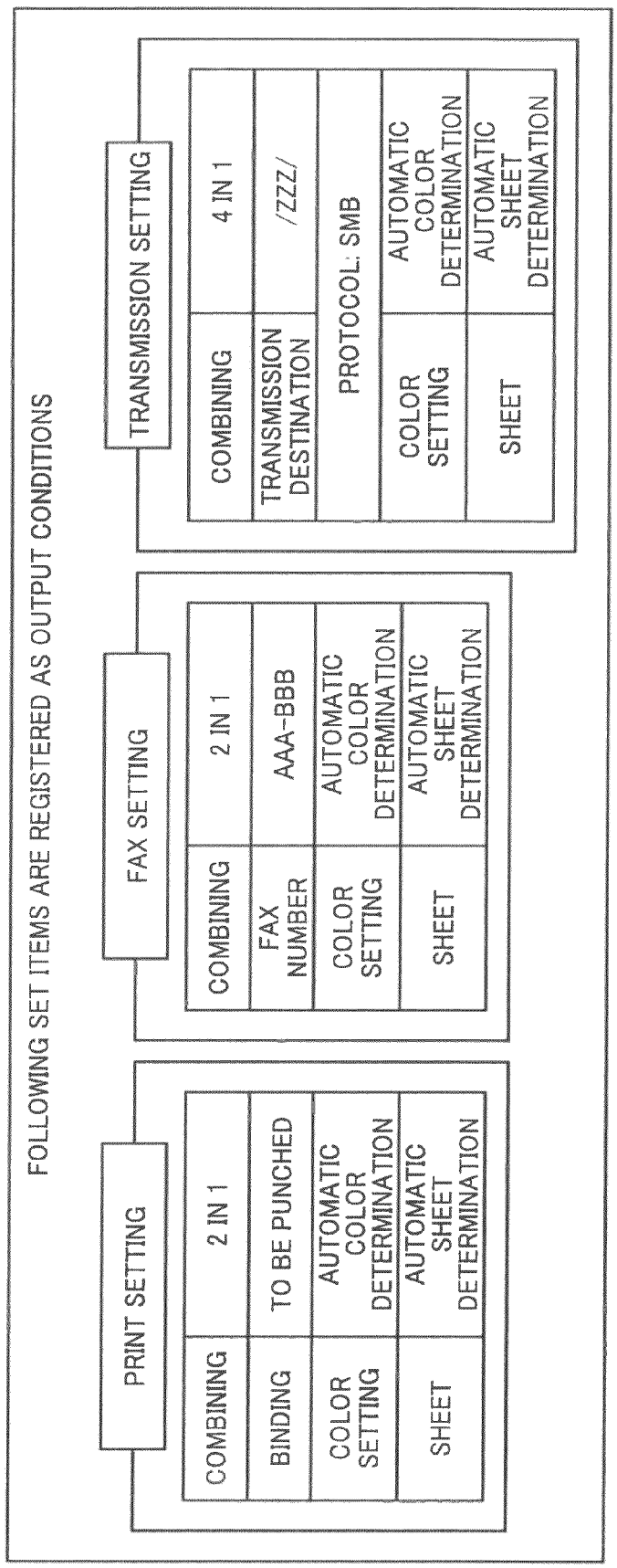
FIG. 5 is a diagram that illustrates an example of set items contained in a re-output condition for each function.

FIG. 5 is a diagram that illustrates an example of the set items contained in the re-output condition for each function. The function means a process performed on the document data. In FIG. 5, the re-output conditions of three functions, i.e., the print setting, the FAX setting, and the transmission setting, are displayed.

As illustrated in FIG. 5, in the re-output condition of the print setting, "2 in 1" for combining, "to be punched" for binding, "automatic color determination" for the color setting, and "automatic sheet determination" for the sheet are registered.

Furthermore, in the re-output condition of the FAX setting, "2 in 1" for combining, "AAA-BBB" for a FAX number, "automatic color determination" for the color setting, and "automatic sheet determination" for the sheet are registered.

In the re-output condition of the transmission setting, "4 in 1" for combining, "/ZZZ/" for a transmission destination, "automatic color determination" for the color setting, and "automatic sheet determination" for the sheet are registered.

Because the transmission destination "/ZZZ/" is registered in the dependency relation rule 112 as a dependent item, the display control unit 106 displays "protocol:SMB", which is a dependence-destination item, in addition to the re-output condition.

If the determining unit 105 determines that a dependent item is present, the registration unit 107 registers, in the HDD 110, the dependence-destination item acquired and displayed by the display control unit 106 in addition to the re-output condition associated with the selected document data.

The condition setting unit 102 sets, as the output condition 111, the re-output condition associated with the document data for which the selection is received by the input control unit 101 as the document data that is a target to be output, or sets the dependence-destination item acquired by the display control unit 106 together with the re-output condition.

The image output unit 103 outputs all document data selected as a target to be output in accordance with the output condition set by the condition setting unit 102.

Figure 6:
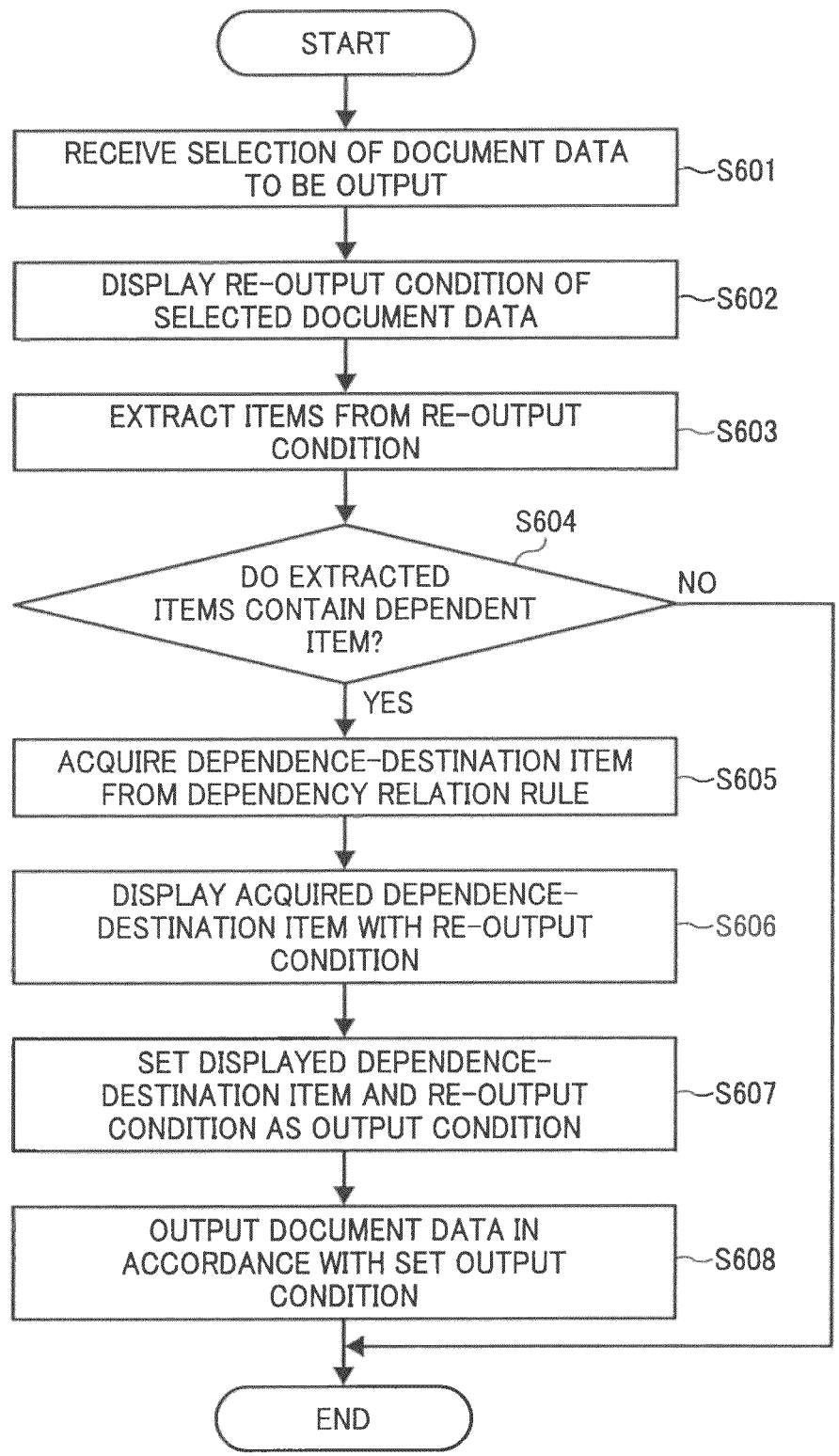
FIG. 6 is a flowchart that illustrates the procedure of a dependence-destination item display process.

Next, an explanation will be given of a dependence-destination item display process by the image processing apparatus 100 configured as described above. FIG. 6 is a flowchart that illustrates the procedure of the dependence-destination item display process.

The display control unit 106 displays the document data stored in the HDD 110 on the operation display unit 20, and the input control unit 101 receives the selection of document data that is a target to be output from the user via the operation display unit 20 (step S601).

The display control unit 106 collectively displays the re-output conditions associated with the selected document data on a screen of the operation display unit 20 (step S602). It is also possible that, if a plurality of re-output conditions is set for the selected document data in association with a plurality of output functions, all of the output conditions are displayed on the screen, as illustrated in FIG. 5.

The item extracting unit 104 extracts items from the re-output condition associated with the document data (step S603).

The determining unit 105 determines whether the extracted items contain a dependent item (step S604). Specifically, the determining unit 105 checks whether the extracted items are registered in the dependency relation rule 112 as dependent items by referring to the dependency relation rule 112.

If it is determined that a dependent item is contained (step S604: Yes), the display control unit 106 acquires the dependence-destination item that corresponds to the dependent item from the dependency relation rule 112 (step S605).

Upon acquiring the corresponding dependence-destination item, the display control unit 106 displays the acquired dependence-destination item together with the re-output condition on the operation display unit 20 (step S606).

Figure 7A:
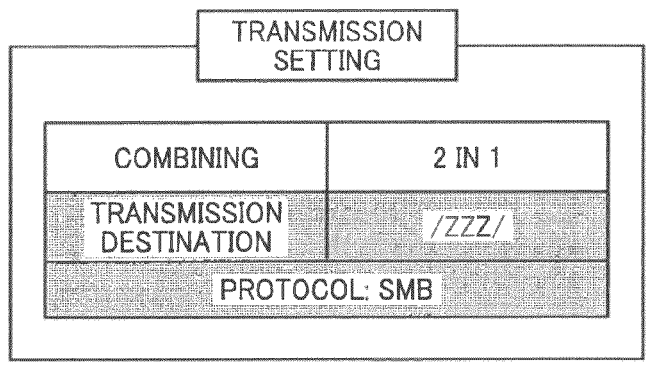
FIG. 7A is a diagram that illustrates a display example of the dependence-destination item.
Figure 7B:
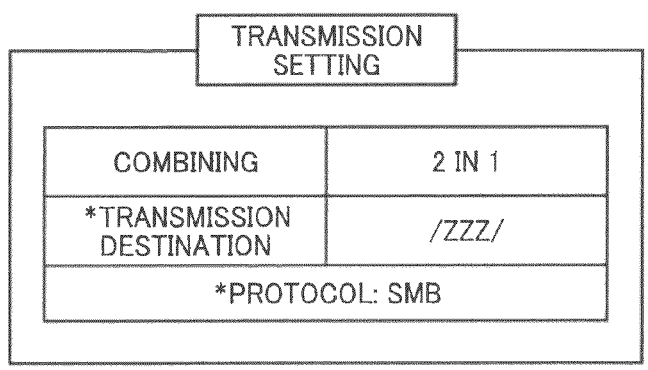
FIG. 7B is a diagram that illustrates a display example of the dependence-destination item.
Figure 7C:
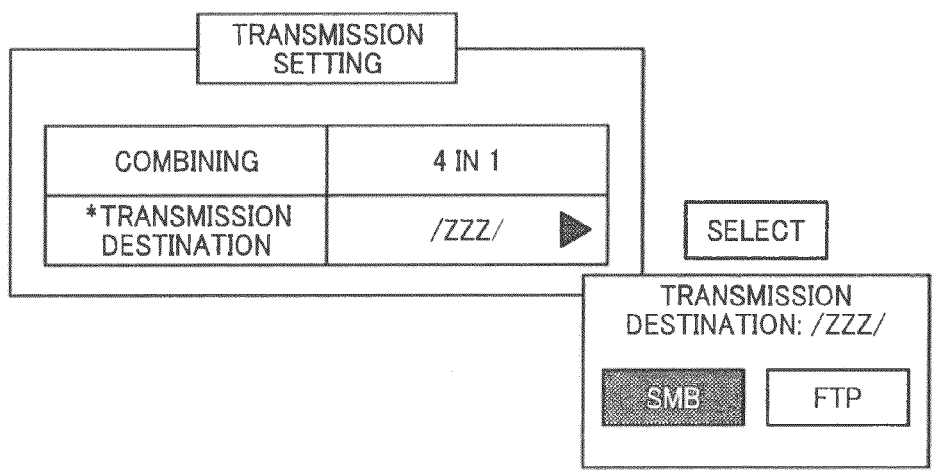
FIG. 7C is a diagram that illustrates a display example of the dependence-destination item.

FIGS. 7A to 7C are diagrams that illustrate display examples of the dependence-destination item. As illustrated in FIGS. 7A to 7C, the dependent item and the dependence-destination item are displayed in a form such that they are identifiable from other items in one view so that the dependency relation can be clearly indicated to the user.

In FIG. 7A, the display control unit 106 displays the dependent item "/ZZZ/" and the corresponding dependence-destination item "protocol:SMB" in a different color from other items.

Furthermore, in FIG. 7B, the display control unit 106 displays the dependent item "/ZZZ/" and the corresponding dependence-destination item "protocol:SMB" with a marker "*". The marker "*" is used for indicating the dependent item and the dependence-destination item.

Moreover, in FIG. 7C, the display control unit 106 displays the dependence-destination item "protocol:SMB" that corresponds to the dependent item "/ZZZ/" in a hierarchical manner. Because of the hierarchical display, the dependence-destination item is displayed in a different display form from the display form of the dependent item.

The condition setting unit 102 sets the displayed dependence-destination item and the re-output condition as the output condition (step S607).

The image output unit 103 outputs the document data that is a target to be output in accordance with the output condition set by the condition setting unit 102 (step S608), and all processes are terminated.

Next, an explanation will be given of the process of storing the dependence-destination item. FIG. 8 is a flowchart that illustrates the procedure of the dependence-destination item storing process.

The image output unit 103 outputs the document data in accordance with the set output condition (step S801), and the display control unit 106 displays the output condition in which the document data is output on the operation display unit 20 (step S802).

The item extracting unit 104 extracts items from the output condition in which the document data is output (step S803).

The determining unit 105 determines whether the extracted items contain a dependent item (step S804). Specifically, the determining unit 105 conducts a search as to whether the extracted item is registered in the dependency relation rule 112 as a dependent item by referring to the dependency relation rule 112 stored in the HDD 110.

If the determining unit 105 determines that the extracted items contain a dependent item (step S804: Yes), the display control unit 106 acquires the dependence-destination item from the dependency relation rule and displays it on the operation display unit 20 (step S805).

Specifically, the dependence-destination item that corresponds to the dependent item searched by the determining unit 105 is acquired from the dependency relation rule 112, and the acquired dependence-destination item is displayed on the operation display unit 20.

The registration unit 107 registers, as the re-output condition, the dependence-destination item acquired by the display control unit 106 together with the re-output condition associated with the selected document data in the HDD 110 (step S806), and all processes are terminated.

Thus, according to the present embodiment, because the dependent item is displayed together with the re-output condition, it is possible to prevent an erroneous setting of the output condition and to definitely set the output condition desired by the user.

Furthermore, according to the present embodiment, because all items set by the re-output condition are collectively displayed on the display screen, the user can instantly check the specific items of the set output condition, whereby an erroneous setting of the output condition can be prevented.

Furthermore, according to the present embodiment, the items for which the re-output condition is set can be displayed on the display screen in a form such that they are identifiable in one view by the user.

Moreover, according to the present embodiment, because all items set by the re-output condition can be displayed on one screen, it is possible to prevent wrong transmission due to a selection mistake and to obtain the output result intended by the user.

Moreover, according to the present embodiment, the user can change or cancel the automatically set items in a simple and easy manner.

Furthermore, according to the present embodiment, the dependent item that corresponds to the item contained in the re-output condition is displayed with the re-output condition so that it is possible to prevent an erroneous setting of the output condition and definitely set the output condition desired by the user.

Moreover, because the user can instantly check the specific items of the set output condition, it is possible to prevent an erroneous setting of the output condition and specify a target item to be changed or canceled from the set output condition in an easy manner.

(Second Embodiment)

FIG. 9 is a block diagram that illustrates the configuration of an image processing apparatus 900 according to a second embodiment. As illustrated in FIG. 9, the image processing apparatus 900 principally includes the input control unit 101, the condition setting unit 102, the image output unit 103, the item extracting unit 104, the determining unit 105, a display control unit 906, the registration unit 107, and an HDD 910 and is connected to the operation display unit 20.

In the image processing apparatus 100 according to the first embodiment, the display control unit 106 displays all re-output conditions associated with a plurality of output functions simply by associating them with each of the output functions.

On the other hand, according to the present embodiment, the display control unit 906 separately displays, among re-output conditions of a plurality of output functions, common items that are items common to all of the output functions and individual items that are items associated with the individual output functions.

In addition, according to the present embodiment, the display control unit 906 also displays the display screen that receives an input to change settings for an item contained in the re-output condition.

Because the configuration and the function of each unit except the display control unit 906 and the HDD 910 are the same as those in the image processing apparatus 100 according to the first embodiment, their explanations are omitted.

The HDD 910 also stores therein item information 913 in addition to the output condition 111 and the dependency relation rule 112 stored according to the first embodiment.

The item information means information that classifies a plurality of items that constitute the output condition into major items that indicate a category of a processing function and minor items that indicate a specific processing condition of a major item.

FIG. 10 is a diagram that illustrates an example of the item information. In FIG. 10, "color setting" and "combining" are registered as processing functions that are major items.

"Color", "monochrome", "automatic color determination", and "two colors" are registered as minor items classified into the category of the major item "color setting", and "OFF", "2 in 1", "4 in 1", and "16 in 1" are registered as the minor items classified into the category of the major item "combining".

The display control unit 906 checks whether a plurality of re-output conditions that corresponds to a plurality of output functions is associated with the selected document data and, if a plurality of re-output conditions is associated, common items and individual items are classified from all of the re-output conditions and separately displayed.

Furthermore, the display control unit 906 displays each item on the operation display unit 20 in a format such that it can be changed.

Figure 11:
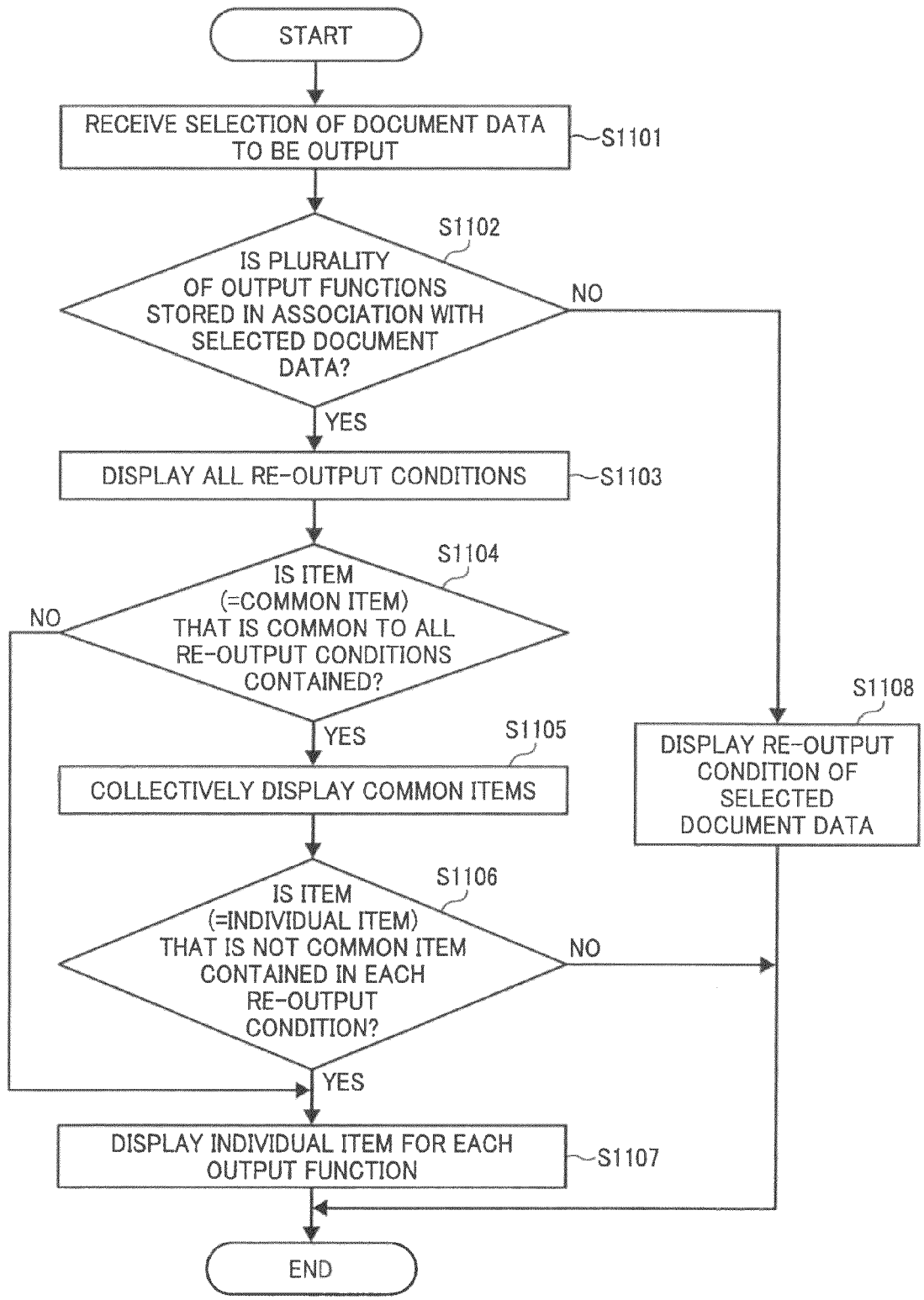
FIG. 11 is a flowchart that illustrates the procedure of a common-item display process.

Next, an explanation will be given of the process of displaying the common items and the individual items. FIG. 11 is a flowchart that illustrates the procedure of the common-item display process.

The display control unit 906 displays the document data stored in the HDD 110 on the operation display unit 20, and the input control unit 101 receives the selection of the document data that is a target to be output from the user via the operation display unit 20 (step S1101).

The display control unit 906 checks whether a plurality of re-output conditions that corresponds to a plurality of output functions is associated with the selected document data (step S1102).

If it is checked that a plurality of re-output conditions that corresponds to a plurality of output functions is associated (step S1102: Yes), the display control unit 906 displays all of the re-output conditions (step S1103) and determines whether all of the re-output conditions contain common items (step S1104).

If it is determined that common items are contained (step S1104: Yes), the display control unit 906 collectively displays the common items on the screen of the operation display unit 20 (step S1105).

On the other hand, if it is determined that the common items are not contained (step S1104: No), the individual items are displayed for each output function (step S1107).

Returning to step S1105, the display control unit 906 checks whether an individual item is contained in a plurality of re-output conditions that corresponds to a plurality of output functions (step S1106).

If it is checked that an individual item is contained in a plurality of re-output conditions (step S1106: Yes), the display control unit 906 displays the individual item for each output function (step S1107).

Figure 12:
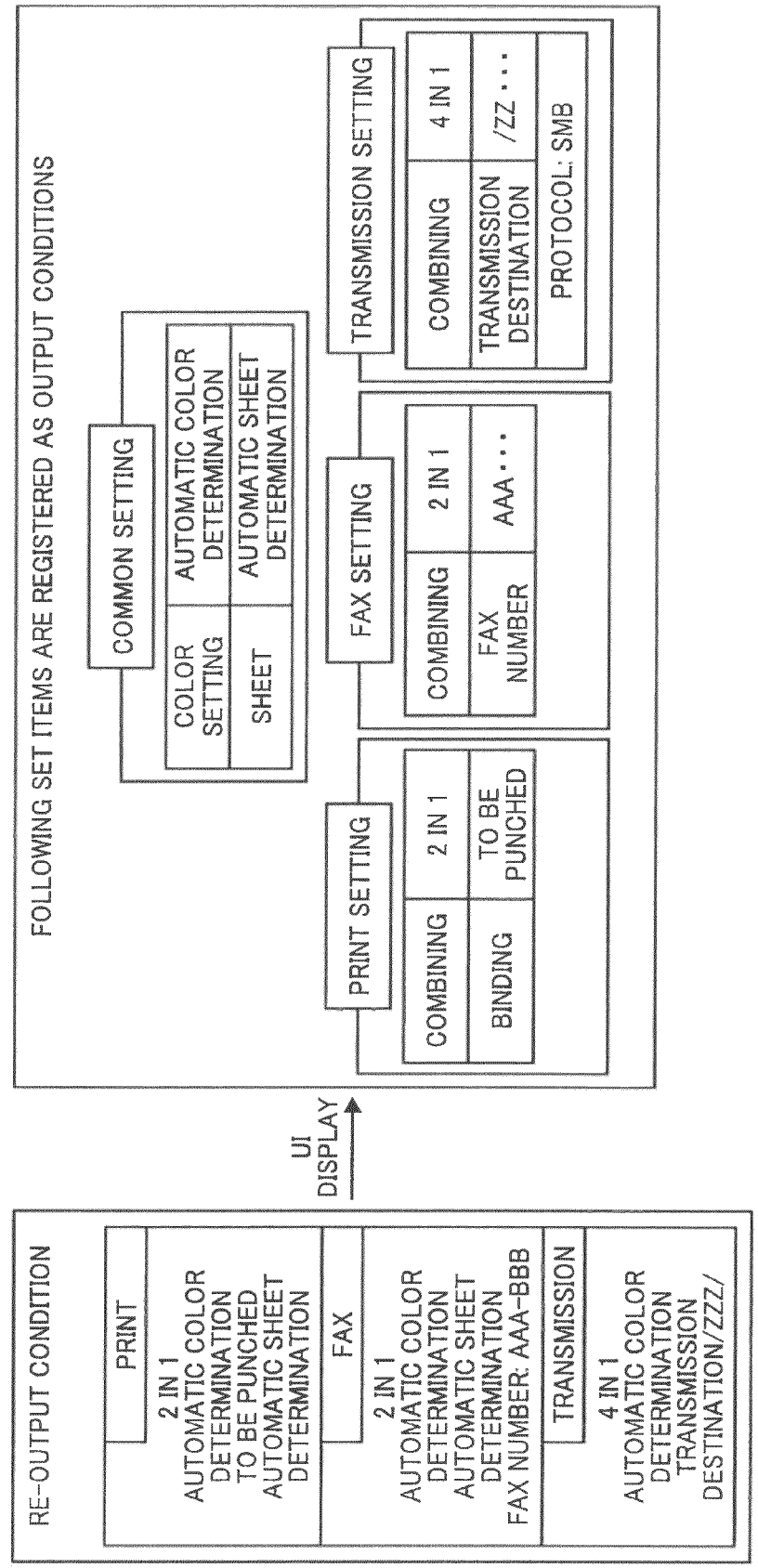
FIG. 12 is a diagram that illustrates an example of the screen in which common items and individual items are displayed.

FIG. 12 is a diagram that illustrates an example of the screen in which the common items and the individual items are displayed. As illustrated in FIG. 12, the common items of three output functions, i.e., "print setting", "FAX setting", and "transmission setting", are "automatic color determination" and "automatic sheet determination", and the display control unit 906 collectively displays them as the common items.

Furthermore, the display control unit 906 separately displays, as the individual items of the three output functions, "2 in 1" and "to be punched" for "print setting", "2 in 1" and "FAX number AAA" for "FAX setting", and "4 in 1" and "transmission destination/ZZZ" for "transmission setting".

Returning to step S1102, if a plurality of re-output conditions that corresponds to the selected document data is not associated (step S1102: No), the display control unit 906 displays the re-output condition associated with the selected document data on the operation display unit 20 (step S1108), and all processes are terminated.

Figure 13:
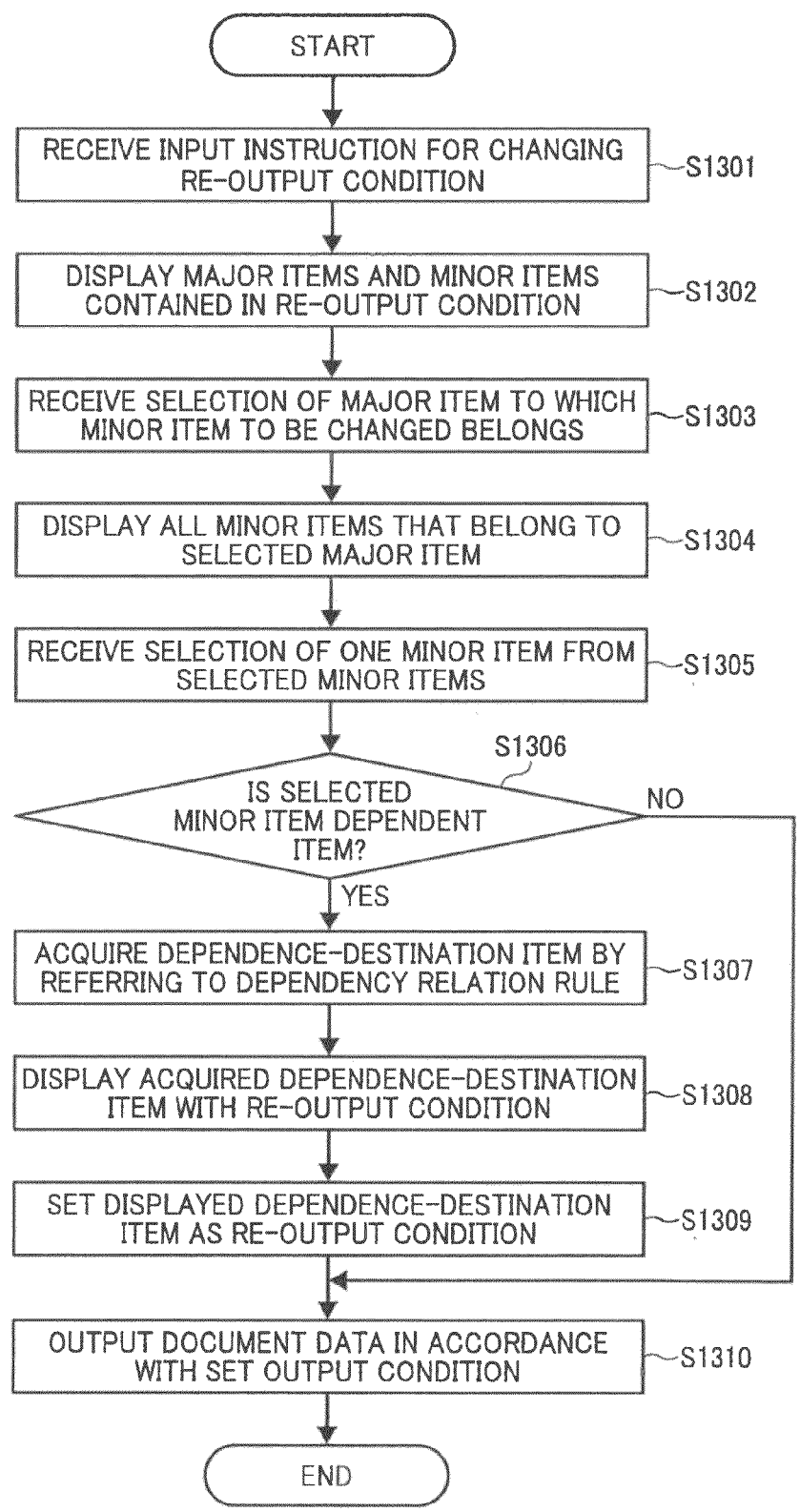
FIG. 13 is a flowchart that illustrates the procedure of an item change process.

Next, an explanation will be given of the process of changing the item contained in the re-output condition. FIG. 13 is a flowchart that illustrates the procedure of the item change process.

The input control unit 101 receives an input instruction for changing the item contained in the re-output condition from the user via the operation display unit 20 (step S1301).

The display control unit 906 displays the major items and the minor items contained in the re-output condition on the operation display unit 20 (step S1302), and the input control unit 101 receives the selection of the major item to which the minor item that is a target to be changed belongs (step S1303).

The display control unit 906 displays all of the minor items that belong to the selected major item on the operation display unit 20 (step S1304) and receives the selection of one minor item among the displayed minor items (step S1305).

Figure 14:
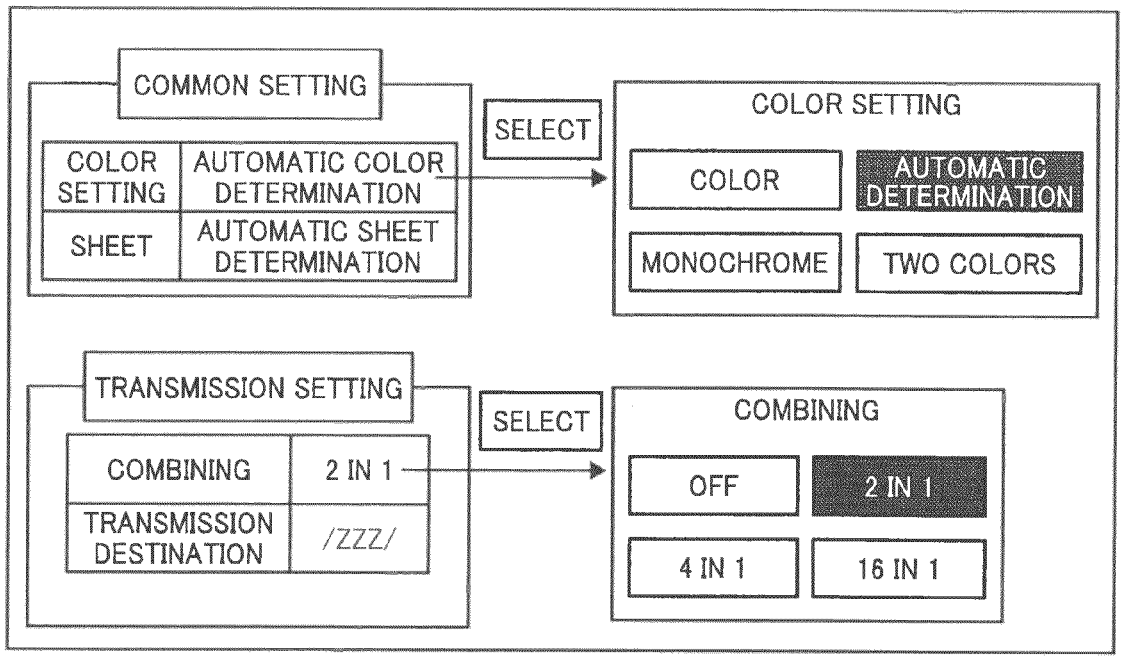
FIG. 14 is a diagram that illustrates an example of the selection screen of the item to be changed.

FIG. 14 is a diagram that illustrates an example of the selection screen of the item to be changed. As illustrated in FIG. 14, because the major item "color setting" to which the minor item "automatic color determination" as a target to be changed belongs is selected among the common items, the display control unit 906 displays all of the minor items "color", "automatic determination", "monochrome", and "two colors" that belong to the major item "color setting".

In the same manner, because the major item "combining" to which the minor item "2 in 1" as a target to be changed belongs is selected with respect to the individual item, the display control unit 906 displays all of the minor items "OFF", "2 in 1", "4 in 1", and "16 in 1" that belong to the major item "combining".

Figure 15:
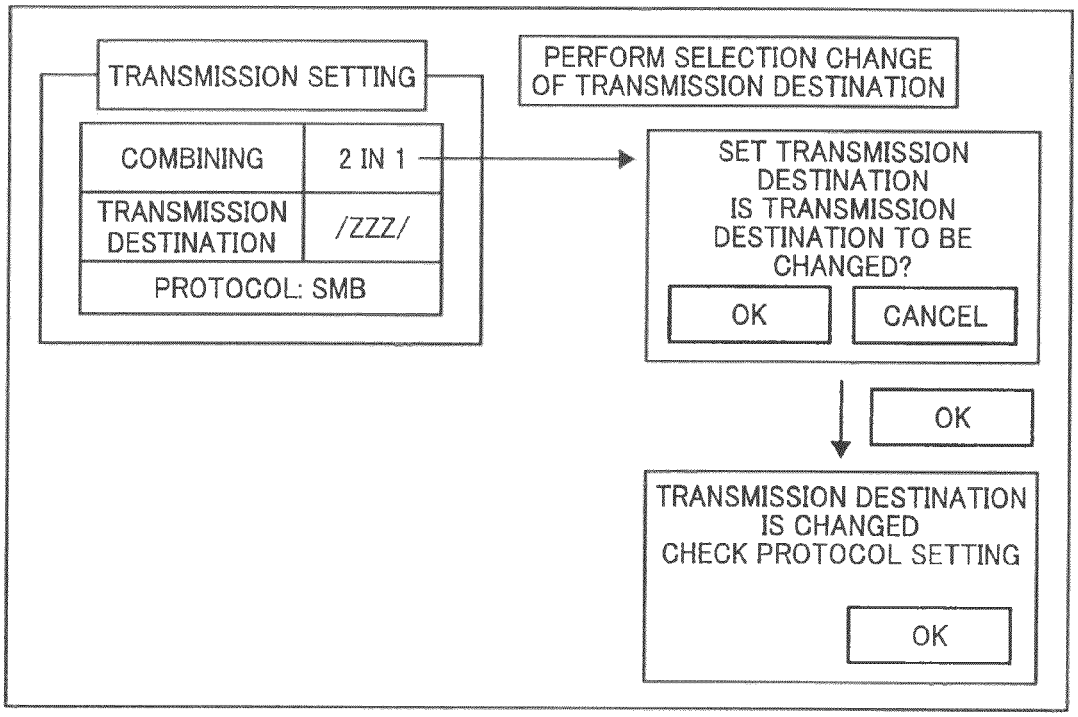
FIG. 15 is a diagram that illustrates an example of the setting confirmation screen of the changed item.

FIG. 15 is a diagram that illustrates an example of the setting confirmation screen of the changed item. As illustrated in FIG. 15, if the minor item is selected, the display control unit 906 can display the confirmation screen indicating that the setting is changed in accordance with the selected contents.

In FIG. 15, the transmission destination "/ZZZ/" is selected as a target to be changed. Because the transmission destination is registered in the dependency relation rule 112 as a dependent item, the display control unit 906 further displays the confirmation screen with respect to the dependence-destination item.

The determining unit 105 determines whether the selected minor item is a dependent item (step S1306). Specifically, it conducts a search as to whether the item for which the selection is received is registered as a dependent item by referring to the dependency relation rule 112.

If it is determined that the selected minor item is a dependent item (step S1306: Yes), the display control unit 906 acquires the dependence-destination item from the dependency relation rule 112 (step S1307).

The display control unit 906 collectively displays the acquired dependence-destination item together with the re-output condition on the screen of the operation display unit 20 (step S1308).

The condition setting unit 102 sets the displayed dependence-destination item and the displayed re-output condition as the output condition (step S1309), the image output unit 103 outputs the document data in accordance with the set output condition (step S1310), and all processes are terminated.

Returning to step S1306, if it is determined that the selected minor item is not a dependent item (step S1306: No), the process of displaying and setting the dependence-destination item is not performed, the document data is output in accordance with the re-output condition that includes the selected minor item (step S1310), and all processes are terminated.

Thus, according to the present embodiment, because the common items and the individual items are separately displayed, it is possible to identify the set output condition in an easier manner and prevent an erroneous setting.

Furthermore, according to the present embodiment, because a list of minor items that belong to an item that is a target to be changed is displayed in a selectable format, it is possible to perform an operation of changing and canceling the set output condition in an easy manner.

(Third Embodiment)

Figure 16:
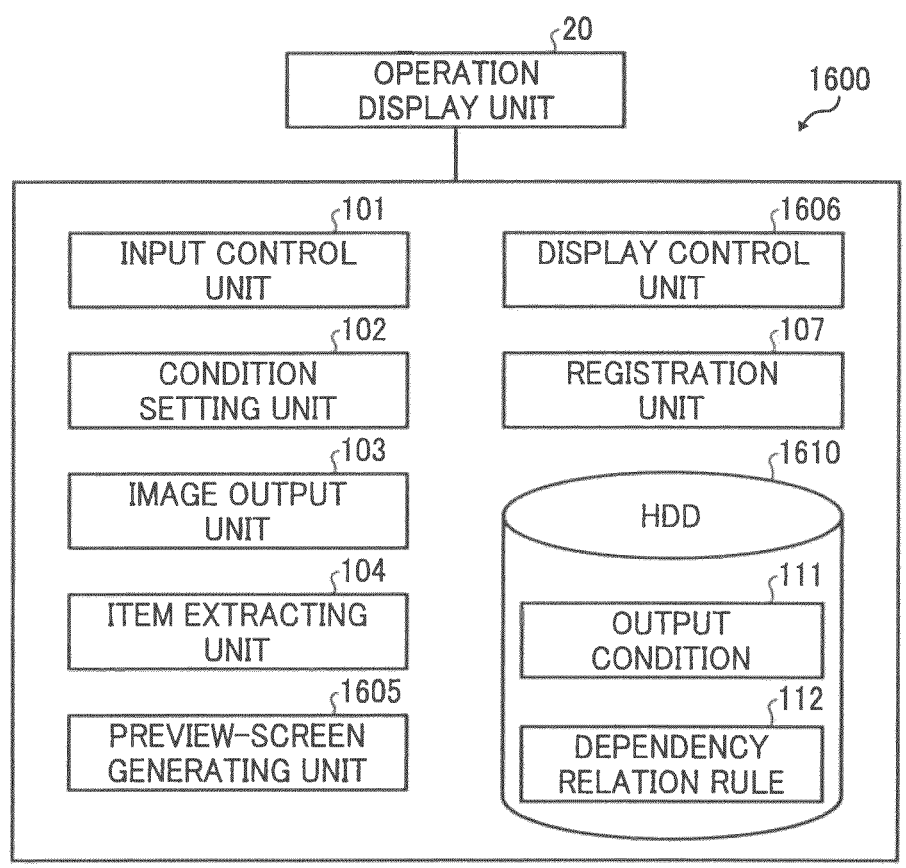
FIG. 16 is a block diagram of an image processing apparatus according to a third embodiment.

FIG. 16 is a block diagram that illustrates the configuration of an image processing apparatus 1600 according to a third embodiment. As illustrated in FIG. 16, the image processing apparatus 1600 principally includes the input control unit 101, the condition setting unit 102, the image output unit 103, the item extracting unit 104, a preview-screen generating unit 1605, a display control unit 1606, the registration unit 107, and an HDD 1610 and is connected to the operation display unit 20.

In the image processing apparatus 100 according to the first embodiment, the display control unit 106 displays all re-output conditions associated with a plurality of output functions simply by associating them with each of the output functions.

On the other hand, according to the present embodiment, the preview-screen generating unit 1605 generates a preview screen from the re-output condition stored in the HDD 1610, and the display control unit 1606 displays the generated preview screen on the operation display unit 20.

Because the configuration and the function of each unit except the preview-screen generating unit 1605, the display control unit 1606, and the HDD 1610 are the same as those of the image processing apparatus 100 according to the first embodiment, their explanations are omitted.

The preview-screen generating unit 1605 generates a preview screen by reducing the size of a screen that includes the items contained in the re-output condition on the basic setting screen that is a screen for setting the output condition and is a screen in a state where the output condition has not been set.

Figure 17:
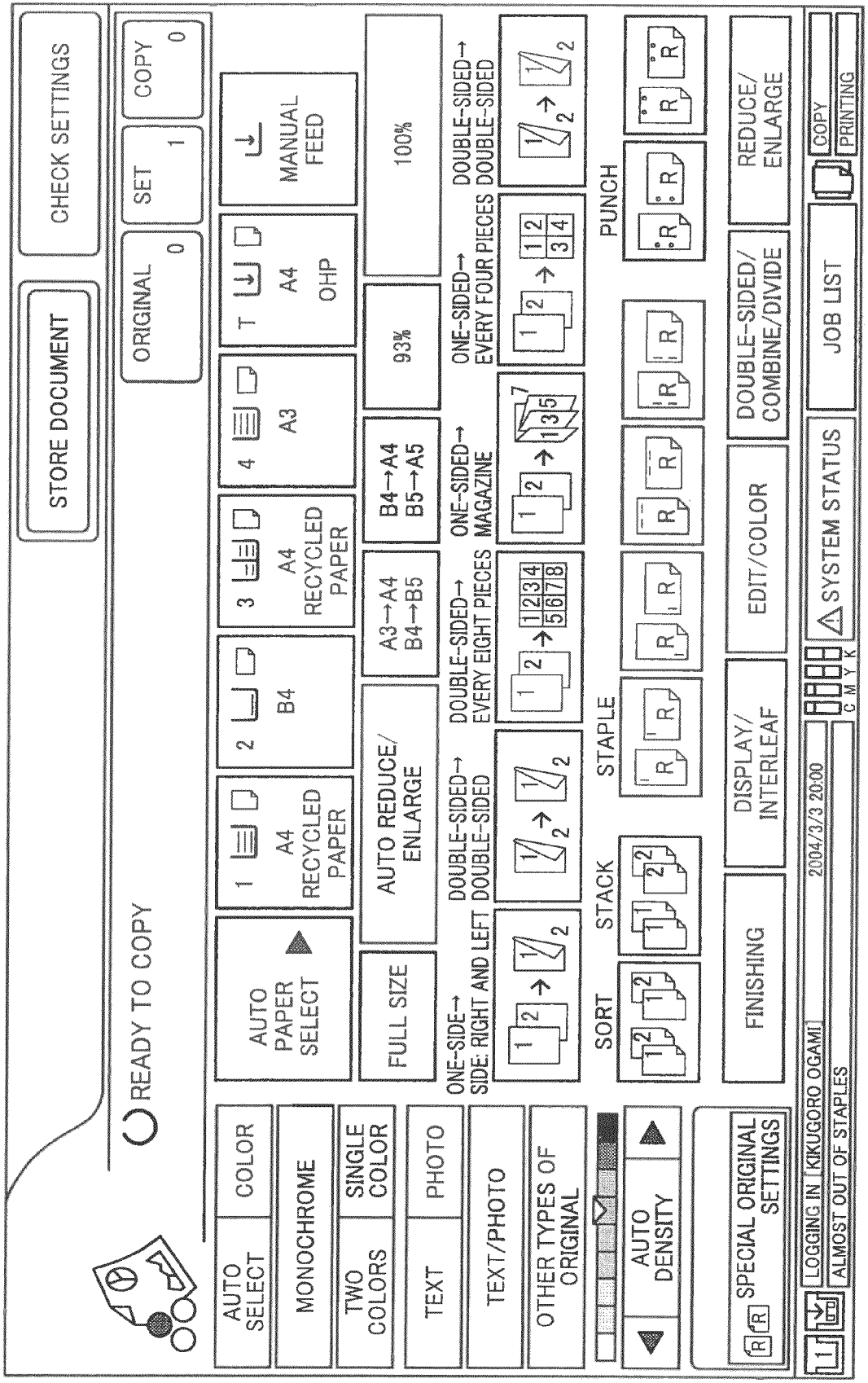
FIG. 17 is a diagram that illustrates an example of the basic setting screen.

FIG. 17 is a diagram that illustrates an example of the basic setting screen. As illustrated in FIG. 17, the set items of various output conditions, such as the sheet size, the color, combining, and the like, are displayed on the basic setting screen in a state where they have not been set.

Figure 18:
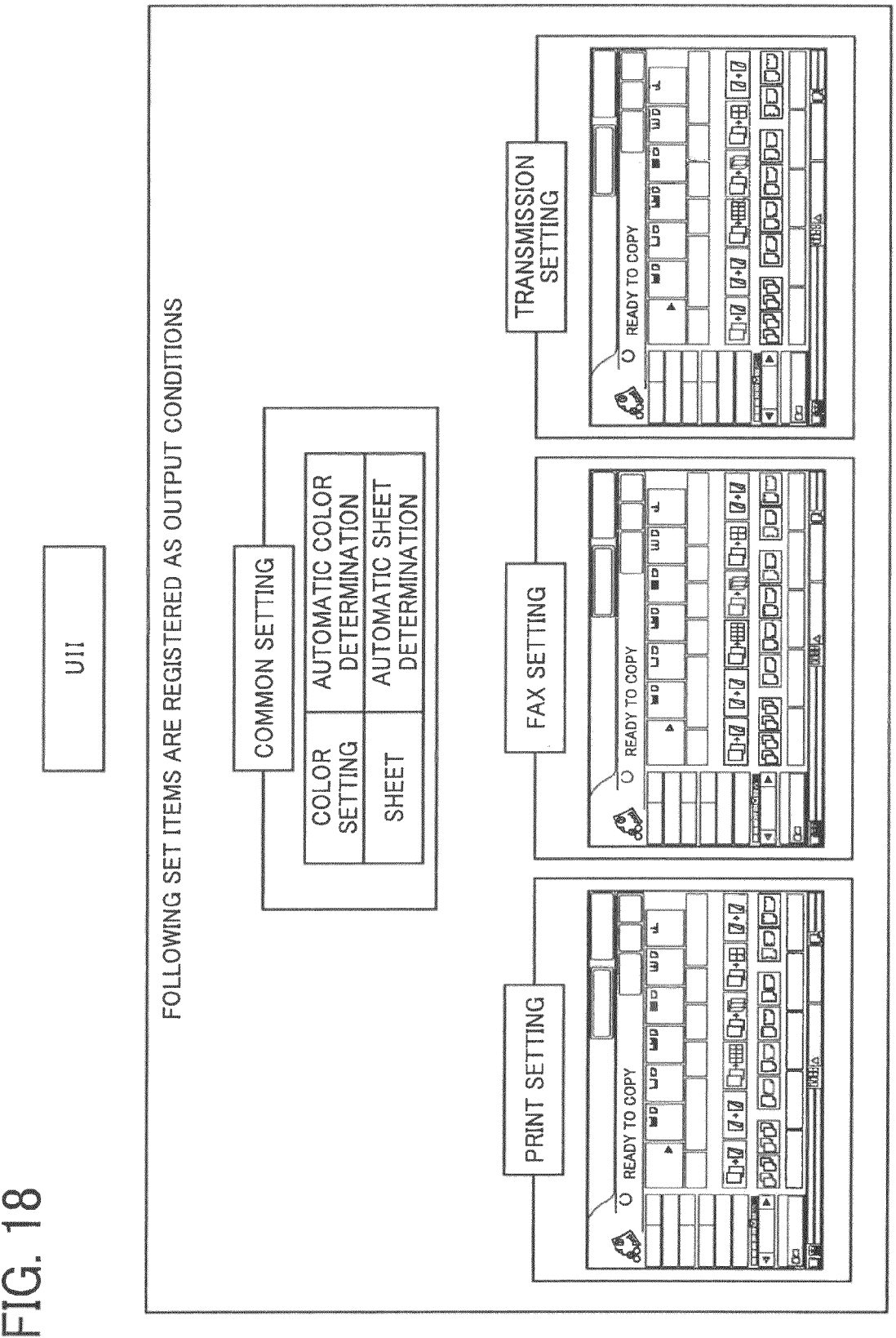
FIG. 18 is a diagram that illustrates an example of the preview screen.

Furthermore, FIG. 18 is a diagram that illustrates an example of the preview screen. As illustrated in FIG. 18, the preview screen that includes the currently set output condition is displayed for each output function on the basic setting screen.

The display control unit 1606 displays the preview screen generated by the preview-screen generating unit 1605 on the operation display unit 20.

The HDD 1610 also stores therein the preview screen generated by the preview-screen generating unit 1605 in addition to the output condition 111 and the dependency relation rule 112 stored according to the first embodiment.

Figure 19:
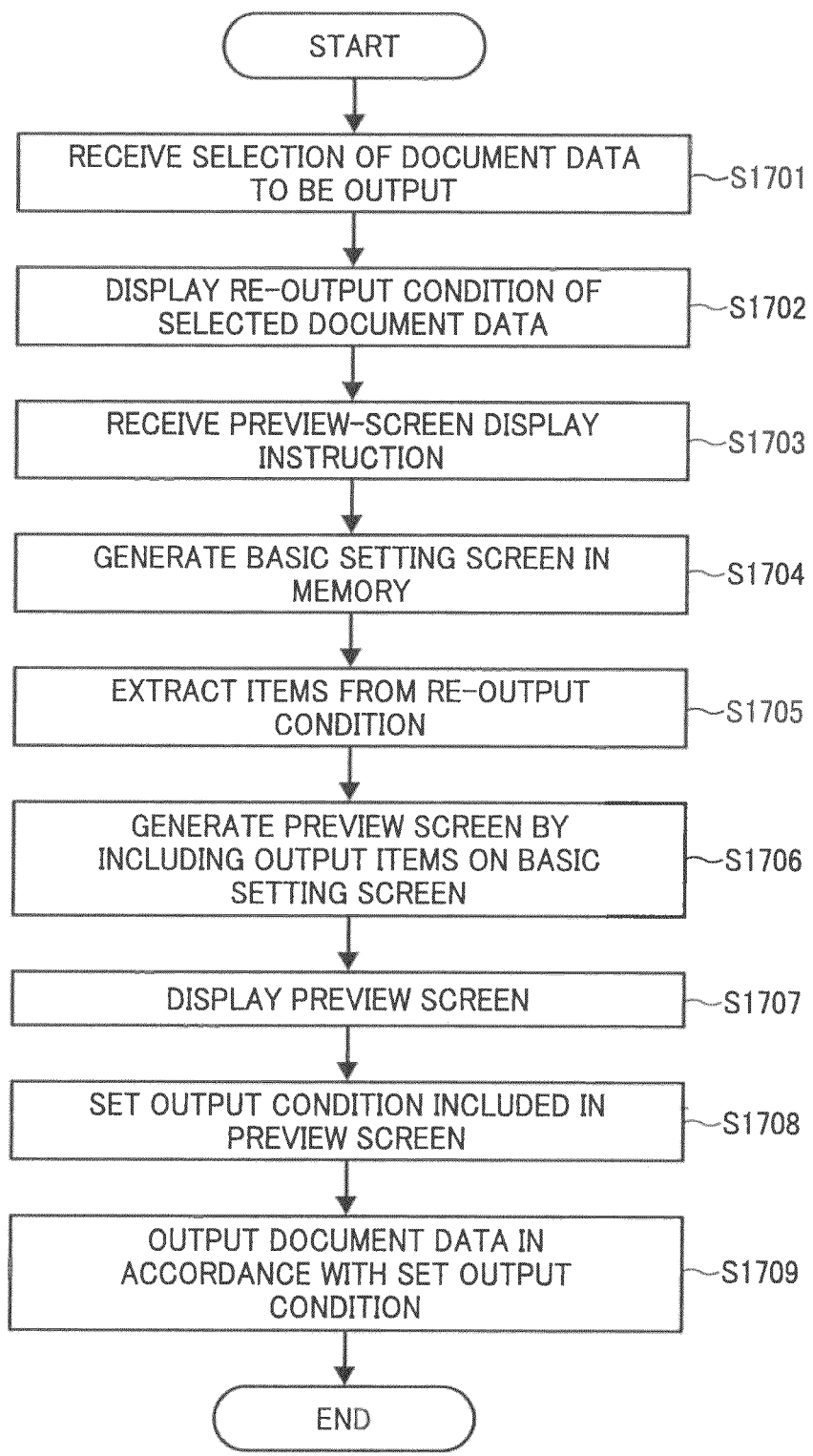
FIG. 19 is a flowchart that illustrates the procedure of a preview-screen generation process.

Next, an explanation will be given of the process of generating the preview screen. FIG. 19 is a flowchart that illustrates the procedure of the preview-screen generation process.

The display control unit 1606 displays the document data stored in the HDD 1610 on the operation display unit 20, and the input control unit 101 receives the selection of the document data that is a target to be output from the user via the operation display unit 20 (step S1701).

The display control unit 1606 displays the re-output condition associated with the selected document data on the operation display unit 20 (step S1702).

The input control unit 101 receives a preview-screen display instruction from the user (step S1703), and the preview-screen generating unit 1605 generates the basic setting screen in a memory (step S1704).

The item extracting unit 104 extracts items from the re-output condition associated with the selected document data (step S1705).

The preview-screen generating unit 1605 generates the preview screen by including the extracted items on the generated basic setting screen (step S1706). The generated preview screen is stored in the memory.

The display control unit 1606 collectively displays the generated preview screens on the screen of the operation display unit 20 (step S1707). If the preview screens extend over a plurality of screens, the plurality of screens is sequentially displayed by button inversion, word change, or the like.

The condition setting unit 102 sets the output condition that is included on the preview screen (step S1708). If a plurality of output functions is provided, the selection of the preview screen is received by the input control unit 101 and the output condition included on the received preview screen is set.

The image output unit 103 outputs the selected document data in accordance with the set output condition (step S1709), and all processes are terminated.

Thus, according to the present embodiment, because the preview screen is generated by including the items contained in the re-output condition on the basic setting screen, the user can check the actual setting status in one view.

Furthermore, because the actual setting status is instantly noticeable by the user, it is possible to prevent an output mistake or transmission mistake due to an erroneous setting.

Figure 20:
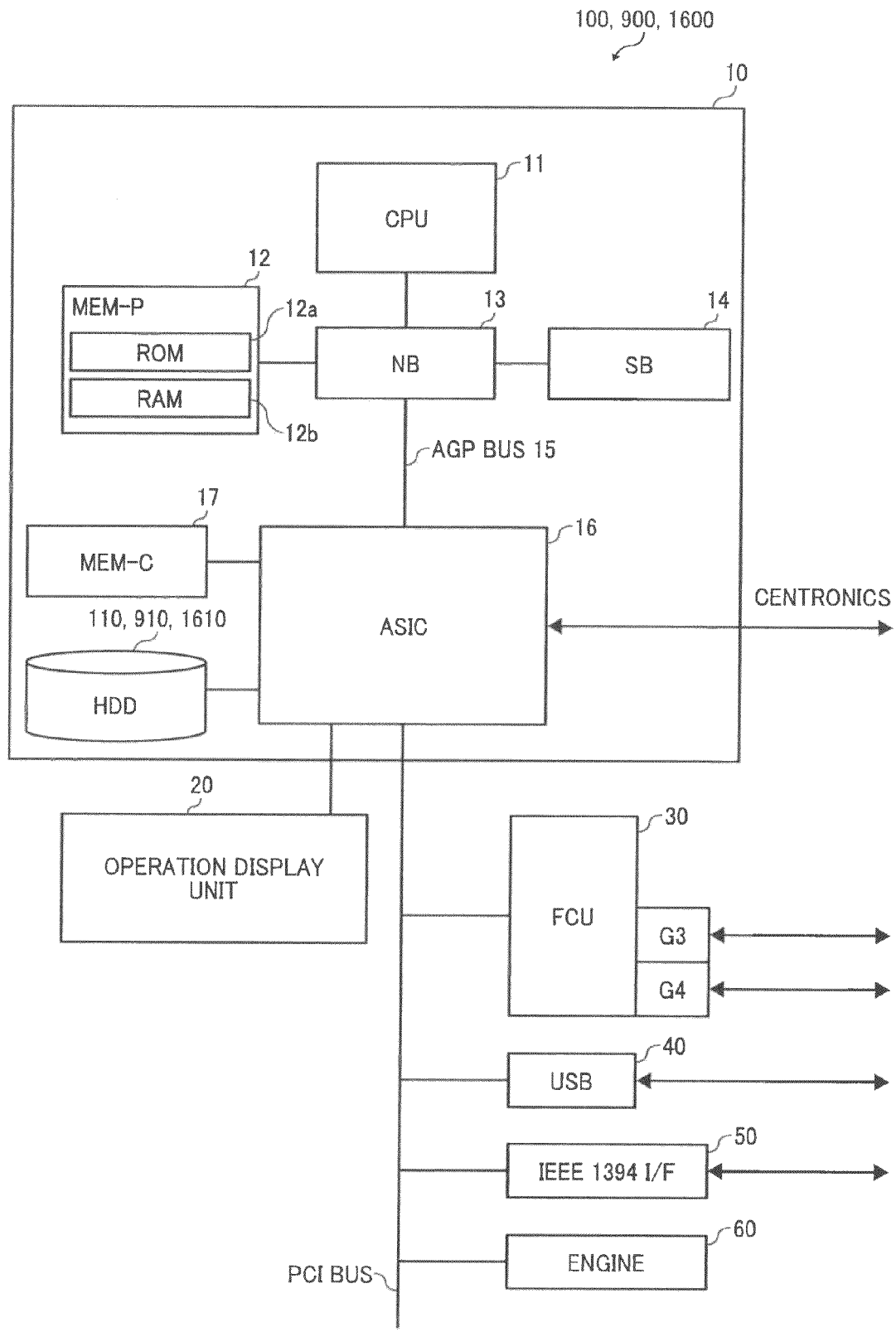
FIG. 20 is a block diagram that illustrates the hardware configuration of multifunction products according to the first to the third embodiments.

FIG. 20 is a block diagram that illustrates the hardware configuration of multifunction products according to the first to the third embodiments. As illustrated in FIG. 20, multifunction products 100, 900, and 1600 have a configuration in which a controller 10 and an engine unit (Engine) 60 are connected to each other via a Peripheral Component Interface (PCI) bus. The controller 10 is a controller that performs the overall control of the multifunction products 100, 900, and 1600 and controls drawings, communication, and input from an undepicted operation unit. The engine unit 60 is a printer engine, for example, a black-and-white plotter, a one-drum color plotter, a four-drum color plotter, a scanner, a fax unit, or the like, that is connectable to the PCI bus. The engine unit 60 includes an image processing section for error diffusion, gamma conversion, or the like, in addition to what is called an engine section such as a plotter.

The controller 10 includes a CPU 11, a north bridge (NB) 13, a system memory (MEM-P) 12, a south bridge (SB) 14, a local memory (MEM-C) 17, an Application Specific Integrated Circuit (ASIC) 16, and hard disk drives (HDDs) 110, 910, 1610 and has the configuration in which the north bridge (NB) 13 and the ASIC 16 are connected via an Accelerated Graphics Port (AGP) bus 15. Furthermore, the MEM-P 12 further includes a Read Only Memory (ROM) 12a and a Random Access Memory (RAM) 12b.

The CPU 11 performs the overall control of the multifunction products 100, 900, and 1600 and includes a chip set constituted by the NB 13, the MEM-P 12, and the SB 14 so that it is connected to other devices via the chip set.

The NB 13 is a bridge to connect the CPU 11, the MEM-P 12, the SB 14, and the AGP bus 15 and includes a memory controller that controls reading and writing to the MEM-P 12, a PCI master, and an AGP target.

The MEM-P 12 is a system memory used as a memory for storing programs and data, a memory for expanding programs and data, a memory for drawing in a printer, or the like and includes the ROM 12a and the RAM 12b. The ROM 12a is a read-only memory used as a memory for storing programs and data, and the RAM 12b is a writable and readable memory used as a memory for expanding programs and data, a memory for drawing in a printer, or the like.

The SB 14 is a bridge to connect the NB 13, a PCI device, and a peripheral device. The SB 14 is connected to the NB 13 via a PCI bus, and a network interface (I/F) unit, or the like, is also connected to the PCI bus.

The ASIC 16 is an Integrated Circuit (IC) intended for image processing that includes a hardware element for image processing, and has a function as a bridge to connect the AGP bus 15, the PCI bus, the HDDs 110, 910, and 1610, and the MEM-C 17. The ASIC 16 is constituted by a PCI target, an AGP master, an arbiter (ARB) that is the central core of the ASIC 16, a memory controller that controls the MEM-C 17, a plurality of Direct Memory Access Controllers (DMACs) that perform the rotation of image data, or the like, by using hardware logic, and a PCI unit that performs data transfer with the engine unit 60 via the PCI bus. A Facsimile Control Unit (FCU) 30, a Universal Serial Bus (USB) 40, an IEEE 1394 (the Institute of Electrical and Electronics Engineers 1394) interface 50 are connected to the ASIC 16 via the PCI bus. The operation display unit 20 is directly connected to the ASIC 16.

The MEM-C 17 is a local memory used as a copy image buffer or a code buffer, and the Hard Disk Drive (HDD) 18 is storage for storing image data, storing programs, storing font data, and storing forms.

The AGP bus 15 is a bus interface for a graphics accelerator card proposed for speeding up a graphics process and directly accesses the MEM-P 12 at a high throughput so that the speed of the graphics accelerator card is increased.

An image processing program executed by the image processing apparatuses 100, 900, and 1600 according to the present embodiment is provided as installed on a ROM, or the like, in advance.

A configuration may be such that an image processing program executed by the image processing apparatuses 100, 900, and 1600 according to the present embodiment is provided by being stored in a form of a file that is installable and executable, in a recording medium readable by a computer, such as a CD-ROM, a flexible disk (FD), a CD-R, and a digital versatile disk (DVD).

Furthermore, a configuration may be such that an image processing program executed by the image processing apparatuses 100, 900, and 1600 according to the present embodiment is stored in a computer connected via a network such as the Internet and provided by being downloaded via the network. Moreover, a configuration may be such that an image processing program executed by the image processing apparatuses 100, 900, and 1600 according to the present embodiment is provided or distributed via a network such as the Internet.

An image processing program executed by the image processing apparatuses 100, 900, and 1600 according to the present embodiment has a module configuration including each of the units described above (the input control unit 101, the condition setting unit 102, the image output unit 103, the item extracting unit 104, the determining unit 105, the display control unit 106, and the registration unit 107) and, as actual hardware, the CPU (processor) reads the image processing program from the ROM and executes the read image processing program to load each of the units described above into a main storage so that the input control unit 101, the condition setting unit 102, the image output unit 103, the item extracting unit 104, the determining unit 105, the display control unit 106, and the registration unit 107 are generated on the main storage.

According to the present invention, it is possible to provide an image processing apparatus, an image processing method, and an image processing program that allow a user to check the set contents of the re-output condition.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
   an input receiving unit that receives an input of document data that is a target to be output and an output condition of the document data;
   an image output unit that outputs the document data in accordance with the received output condition;
   a storage unit that stores therein the output condition under which the document data has been output, as a re-output condition to be set at a time when the document data is re-output; and
   a display control unit that displays the re-output condition on a display unit, wherein
   when a dependent item that is determined to be set together with a different item is present in the re-output condition, the display control unit displays, together with the re-output condition, a dependence-destination item that is the different item,
   the storage unit stores therein, in association with a plurality of different functions with respect to the document data, re-output conditions that are set for performing the functions,
   the display control unit separately displays a common item that is common to all of the re-output conditions stored with respect to the document data and an individual item other than the common item,
   the storage unit stores therein item information in which a plurality of items are classified into a first item that indicates a type of a processing function and a second item that indicates a specific processing condition of the first item and in which the second item is associated with the first item,
   the input receiving unit receives selection of the first item that is a target to be changed from the output condition of the output document data, and
   when the first item that is the target to be changed is selected, the display control unit refers to the item information, acquires a plurality of second items associated with the selected first item, and displays the acquired plurality of second items on the display unit in a selectable form.

2. The image processing apparatus according to claim 1, wherein
   the storage unit stores therein a dependency relation rule that associates the dependent item with the dependence-destination item,
   the image processing apparatus further comprises an item extracting unit that extracts an item from the re-output condition of the output document data,
   when it is determined that the dependent item is present in the extracted item, the display control unit acquires the dependence-destination item that corresponds to the dependent item from the dependency relation rule and displays the acquired dependence-destination item together with the re-output condition on the display unit.

3. The image processing apparatus according to claim 2, wherein
   the input receiving unit receives input to change an item registered in the dependency relation rule, and
   the display control unit displays a screen for checking that the item registered in the dependency relation rule is changed based on the received input.

4. The image processing apparatus according to claim 3, wherein when the input to change the item is received, the registration unit updates the item registered in the dependency relation rule based on the received input.

5. The image processing apparatus according to claim 1, wherein the display control unit displays all of the dependence-destination item and the re-output condition on a screen of the display unit.

6. The image processing apparatus according to claim 1, wherein the display control unit displays the dependence-destination item on the display unit in a different display form from the re-output condition.

7. The image processing apparatus according to claim 1, wherein
   the input receiving unit receives input of selection of one second item from the displayed plurality of second items,
   the image processing apparatus further comprises a determining unit that determines whether the selected second item is the dependent item by referring to a dependency relation rule that associates the dependent item with the dependence-destination item, and
   when the determining unit determines that the selected second item is the dependent item, the display control unit acquires the dependence-destination item from the dependency relation rule and displays the acquired dependence-destination item together with the re-output condition on the display unit.

8. The image processing apparatus according to claim 1, further comprising a registration unit that registers an acquired dependence-destination item in addition to the re-output condition in the storage unit.

9. The image processing apparatus according to claim 8, wherein when the selected second item is the dependent item, the registration unit registers the acquired dependence-destination item in addition to the re-output condition in the storage unit.

10. The image processing apparatus according to claim 1, further comprising:
    a condition setting unit that sets the displayed re-output condition and the displayed dependence-destination item as the output condition; and
    an image forming unit that outputs the input document data in accordance with the set output condition.

11. An image processing method performed in an image processing apparatus that includes an input receiving unit, an image output unit, a storage unit, and a display control unit, the method comprising:
    receiving an input of document data that is a target to be output and an output condition of the document data using the input receiving unit;
    outputting the document data in accordance with the received output condition using the image output unit;
    storing, in the storage unit, the output condition under which the document data has been output, as a re-output condition to be set at a time when the document data is re-output; and displaying, under control of the display control unit, the re-output condition on a display unit, wherein at the displaying, when a dependent item that is determined to be set together with a different item is present in the re-output condition, a dependence-destination item that is the different item is displayed together with the re-output condition, the storing includes storing, in the storage unit, in association with a plurality of different functions with respect to the document data, re-output conditions that are set for performing the functions, the displaying includes separately displaying a common item that is common to all of the re-output conditions stored with respect to the document data and an individual item other than the common item, the storing includes storing item information in which a plurality of items are classified into a first item that indicates a type of a processing function and a second item that indicates a specific processing condition of the first item and in which the second item is associated with the first item, the receiving includes receiving selection of the first item that is a target to be changed from the output condition of the output document data, and when the first item that is the target to be changed is selected, the displaying includes referring to the item information, acquiring a plurality of second items associated with the selected first item, and displaying the acquired plurality of second items on the display unit in a selectable form.

12. A non-transitory computer-readable storage medium storing computer-readable instructions thereon, which, when executed by an image processing apparatus that includes an input receiving unit, an image output unit, a storage unit, and a display control unit, cause the image processing apparatus to execute:

receiving an input of document data that is a target to be output and an output condition of the document data using the input receiving unit;

outputting the document data in accordance with the received output condition using the image output unit;

storing, in the storage unit, the output condition under which the document data has been output, as a re-output condition to be set at a time when the document data is re-output; and displaying, under control of the display control unit, the re-output condition on a display unit, wherein at the displaying, when a dependent item that is determined to be set together with a different item is present in the re-output condition, a dependence-destination item that is the different item is displayed together with the re-output condition, the storing includes storing, in the storage unit, in association with a plurality of different functions with respect to the document data, re-output conditions that are set for performing the functions, the displaying includes separately displaying a common item that is common to all of the re-output conditions stored with respect to the document data and an individual item other than the common item, the storing includes storing item information in which a plurality of items are classified into a first item that indicates a type of a processing function and a second item that indicates a specific processing condition of the first item and in which the second item is associated with the first item, the receiving includes receiving selection of the first item that is a target to be changed from the output condition of the output document data, and when the first item that is the target to be changed is selected, the displaying includes referring to the item information, acquiring a plurality of second items associated with the selected first item, and displaying the acquired plurality of second items on the display unit in a selectable form.

\* \* \* \* \*